(12) United States Patent
Houston et al.

(10) Patent No.: US 8,061,770 B2
(45) Date of Patent: Nov. 22, 2011

(54) MOTOR VEHICLE SEAT WITH AN UNDERFRAME, A SEAT CARRIER AND A SEAT BACK

(75) Inventors: Robert Houston, Leichlingen (DE); Tony Phillip, Solingen (DE)

(73) Assignees: C. Rob. Hammerstein GmbH & Co. KG, Solingen (DE); Bentley Motors Limited, Crewe, Cheshire (GB)

( * ) Notice: Subject to any disclaimer, the term of this patent is extended or adjusted under 35 U.S.C. 154(b) by 232 days.

(21) Appl. No.: 12/337,590

(22) Filed: Dec. 17, 2008

(65) Prior Publication Data

US 2009/0160228 A1     Jun. 25, 2009

(30) Foreign Application Priority Data

Dec. 19, 2007   (DE) .......................... 10 2007 061 870

(51) Int. Cl.
*B60N 2/427* (2006.01)
(52) U.S. Cl. ................................ 297/216.2; 297/216.19
(58) Field of Classification Search ............. 297/216.19, 297/216.2, 216.16; 296/68.1
See application file for complete search history.

(56) References Cited

U.S. PATENT DOCUMENTS

| 5,340,185 | A | 8/1994 | Vollmer |
| 6,048,034 | A * | 4/2000 | Aumont et al. ............... 297/478 |
| 6,302,481 | B1 * | 10/2001 | Swann et al. ............ 297/216.18 |
| 6,334,643 | B1 * | 1/2002 | Lindblad et al. ........... 296/65.09 |

FOREIGN PATENT DOCUMENTS

| DE | 100 11 819 | A1 | 11/2000 |
| DE | 199 43 595 | A1 | 3/2001 |
| DE | 203 02 628 | U1 | 6/2003 |
| DE | 299 24 805 | U1 | 10/2005 |
| DE | 10 2005 055 975 | A1 | 7/2007 |
| DE | 10 2006 060 179 | A1 | 8/2007 |
| DE | 10 2007 030 445 | A1 | 3/2008 |
| KR | 10 2006 000 5427 | A | 1/2006 |

* cited by examiner

*Primary Examiner* — David Dunn
*Assistant Examiner* — Tania Abraham
(74) *Attorney, Agent, or Firm* — McCarter & English, LLP

(57) ABSTRACT

A motor vehicle seat having an underframe comprising at least one base and at least one rear rocker, which is connected to the base through a rear pivot axis, a seat carrier carried by the underframe, a seat back connected to the seat carrier, and a drive device. A crash sensor controls the drive device. In the event of a crash, the drive device pivots the seat carrier inclusive of the seat back about the rear pivot axis, and a seat front edge of the seat carrier is raised at least 10 mm relative to the base.

13 Claims, 4 Drawing Sheets

MOTOR VEHICLE SEAT WITH AN UNDERFRAME, A SEAT CARRIER AND A SEAT BACK

CROSS-REFERENCE TO RELATED APPLICATIONS

This application claims priority to German Application No. DE 10 2007 061 870.2, filed Dec. 19, 2007, which is hereby incorporated by reference in its entirety as part of the present disclosure.

BACKGROUND OF THE INVENTION

The invention relates to a motor vehicle seat with a) an underframe comprising at least one base and at least one rear rocker, which is connected to said base through a rear pivot axis, with b) a seat carrier carried by said underframe, and with c) a seat back connected to said seat carrier.

Such a motor vehicle seat is known from DE 10 2006 060 179 A1 for example. This known motor vehicle seat is what is termed an integrated seat.

In the event of an accident, in particular of a frontal crash, the seat occupant may slide through or submarine. With his or her thighs the passenger then slides forward on the seat part in substantially the x direction and so to say plunges at least partly through his or her safety belt.

Several propositions have been made to reduce this effect. It is known from DE 299 24 805 U1 to interpose a pair of knee levers in the front region of the seat, between underframe and seat carrier. This pair of knee levers is pulled into a stretched position in the event of a crash, so that the front seat edge is raised. Through a coupling rod, a tensile force derived from the tensile force in the safety belt is exerted onto the pair of knee levers. The tensile force occurring in the belt on a belt buckle is deviated and transmitted to the coupling rod.

An apparatus with a drive system is known from DE 100 11 819 A1, this apparatus has an arm disposed in the front region of the seat. In the event of a crash, the drive system actuates this arm; it causes it to rise upright so that the front part of the seat part is raised. A similar proposition is known from KR 10 2006 000 5427 A wherein a plate disposed in the front region of the seat is raised by a drive unit.

From U.S. Pat. No. 5,340,185, it is known to raise a front seat part of a motor vehicle seat as soon as a crash occurs. In the event of a crash, a longitudinal guide is unlocked and a displacement path of the seat caused by the crash is used for erecting a front part of the seat pan. The reader is additionally referred to the following documents: DE 10 2005 055 975 A1, DE 203 02 628 U1 and DE 199 43 595 A1.

One objective is to keep, as far as practicable, the already existing structures for motor vehicles seats, in particular for integrated seats. These seats are intended to be developed without substantially intervening in the kinematics and in the construction in such a manner that an existing and proven motor vehicle seat as it has been indicated in the document mentioned herein above is additionally also equipped with improved protection against sliding through.

SUMMARY OF THE INVENTION

Accordingly, it is the object of the invention to develop the vehicle seat of the type mentioned herein above, which is preferably configured to be an integrated seat, in such a manner that, whilst keeping the construction, and in particular the kinematics to the largest extent possible, a seat position is achieved in the event of a crash that prevents sliding through or submarining.

This object is achieved in view of the motor vehicle seat of the type mentioned herein above by the fact that there is provided a drive device, that there is pro-vided a crash sensor controlling said drive device and only enabling in the event of a crash and that, in the event of a crash, the drive device pivots the seat carrier inclusive of the seat back about the rear pivot point for a seat front edge of the seat carrier to be raised at least 10 mm, preferably at least 20 mm, relative to the base.

This motor vehicle seat is pivoted into another position in the event of a crash. It is pivoted back. A rear pivotal connection serves as the pivot axis. This pivotal movement occurs actively; the drive energy needed for pivotal movement is supplied by the drive device. The drive device is devised for performing the necessary movements within the time available, which is quite short. The drive de-vice is controlled by a crash sensor, which is actually known. It enables in the event of an accident, when other crash sensors such as those for airbags also enable. An already existing sensor such as a crash sensor of the airbag can be used as the crash sensor; but there can also be provided a crash sensor especially for the motor vehicle seat.

The drive device can operate with an electric motor and/or with a pyrotechnically released propellant. This does not exclude other embodiments.

In a preferred development, the underframe has, as known and provided on the prior art vehicle seat, a front rocker arrangement. In accordance with the invention, this rocker arrangement is divided on either side into a pair of levers consisting of a bottom rocker and a top rocker. These two rockers are hinged together in a central hinge point. For the development of the vehicle seat of the invention, it suffices to replace the existing rocker arranged as described by a pair of levers and to associate the drive device to this pair of levers.

Preferably, the pair of levers forms an assembly unit together with the drive de-vice. This assembly unit replaces the front rocker arrangement in the prior art seat. The kinematics of the previously known motor vehicle seat is not changed thereby. In the normal condition, the developed rocker arrangement of the invention, which comprises the pair of levers, behaves geometrically like the prior art rocker arrangement. However, it is additionally possible to stretch the lever arrangement so that its overall length can be increased at least 10 mm, preferably at least 20 mm.

Thus, the difference between the prior art rocker arrangement and the rocker arrangement with the pair of levers only becomes noticeable in the event of a crash. Before that, the developed rocker arrangement behaves just like the prior art rocker arrangement of the type mentioned herein above.

Preferably, the drive device is therefore configured in such a manner that it is associated with a hinge point of one of the two rockers, for example of the bottom rocker, and is additionally hinge-linked to the other rocker.

It has proved advantageous to provide for a stop device that is associated with the drive device and is located in proximity to the drive device. This stop device makes certain that the new position achieved upon actuation of the drive device, for example a new angular position of the two levers, will be maintained in future as well. It is thus prevented that, when in particular the passenger is subjected to load, the pivotal movement is reversed.

Other features and advantages will become more apparent upon reviewing the appended claims and the following non restrictive description of two embodiments of the invention, given by way of example only with reference to the drawing.

DETAILED DESCRIPTION OF THE INVENTION

Figure 4:
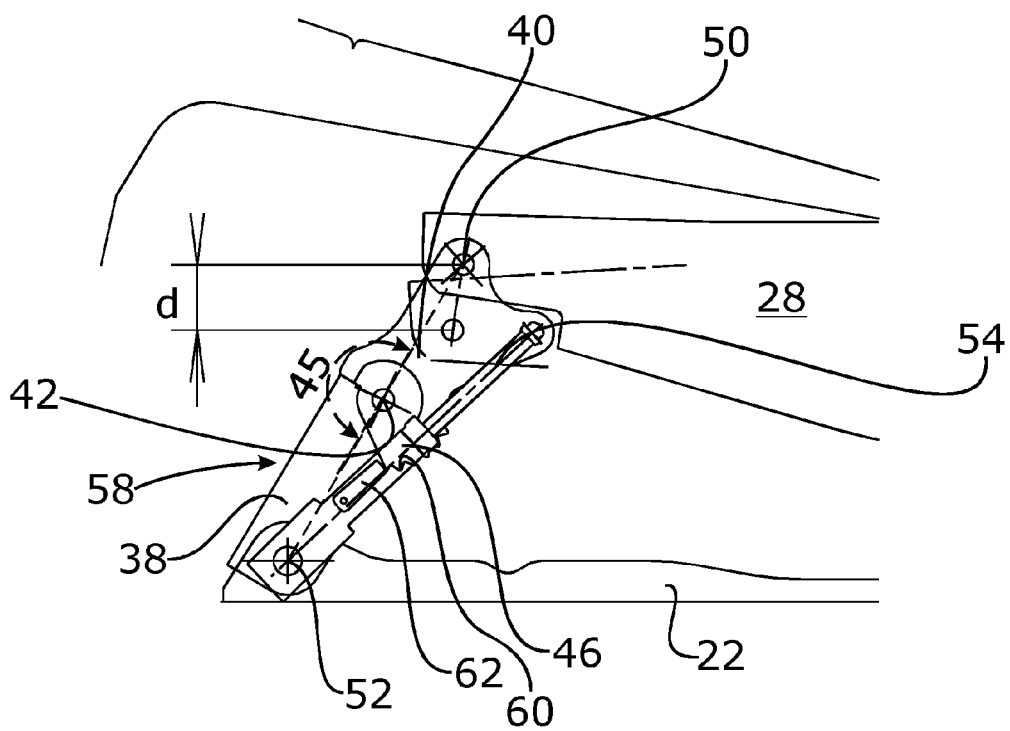
FIG. 4: shows the corresponding detail of FIG. 2 to an enlarged scale.
Figure 5:
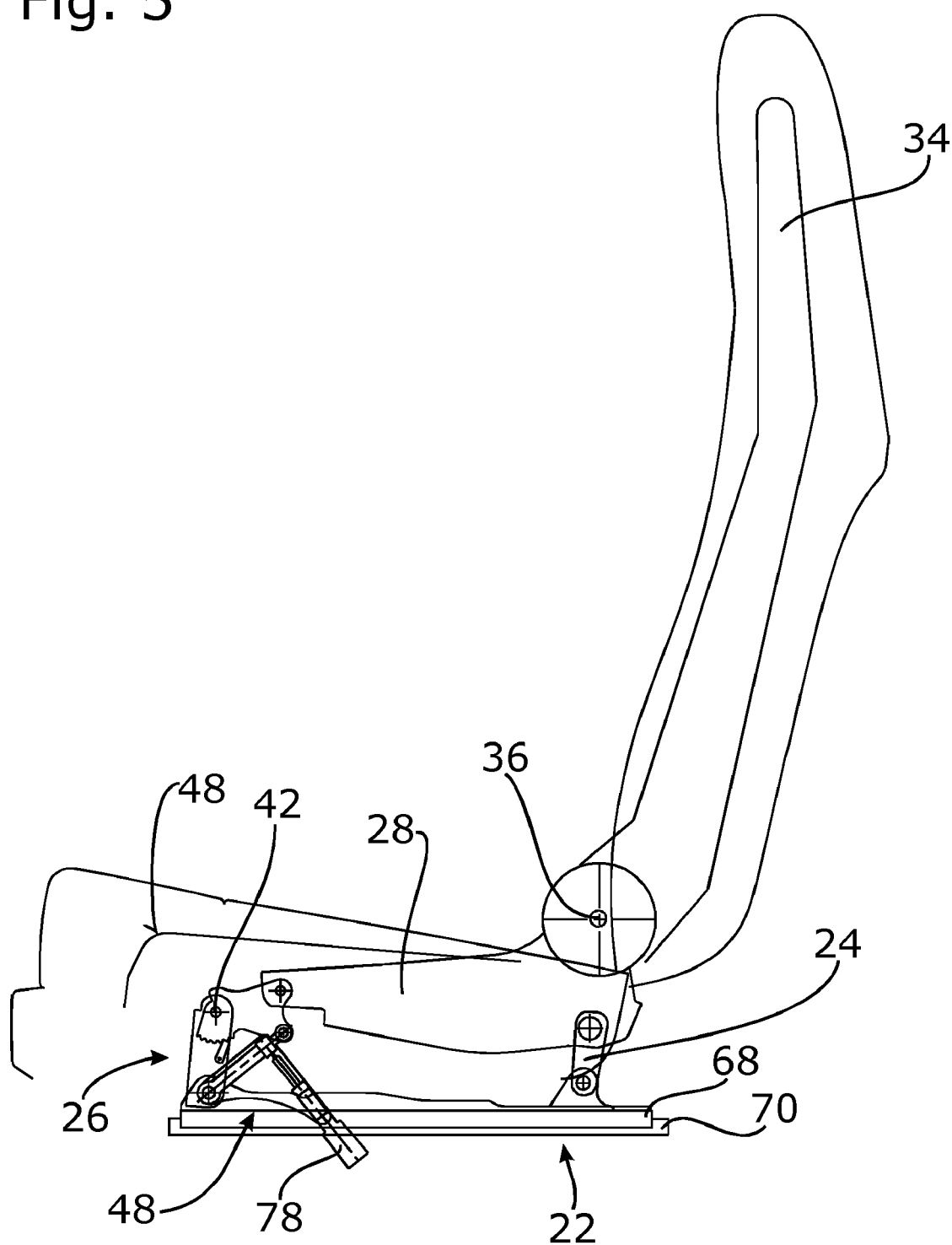
FIG. 5: is an illustration of a motor vehicle seat like in FIG. 1, but now in an amended configuration.
Figure 6:
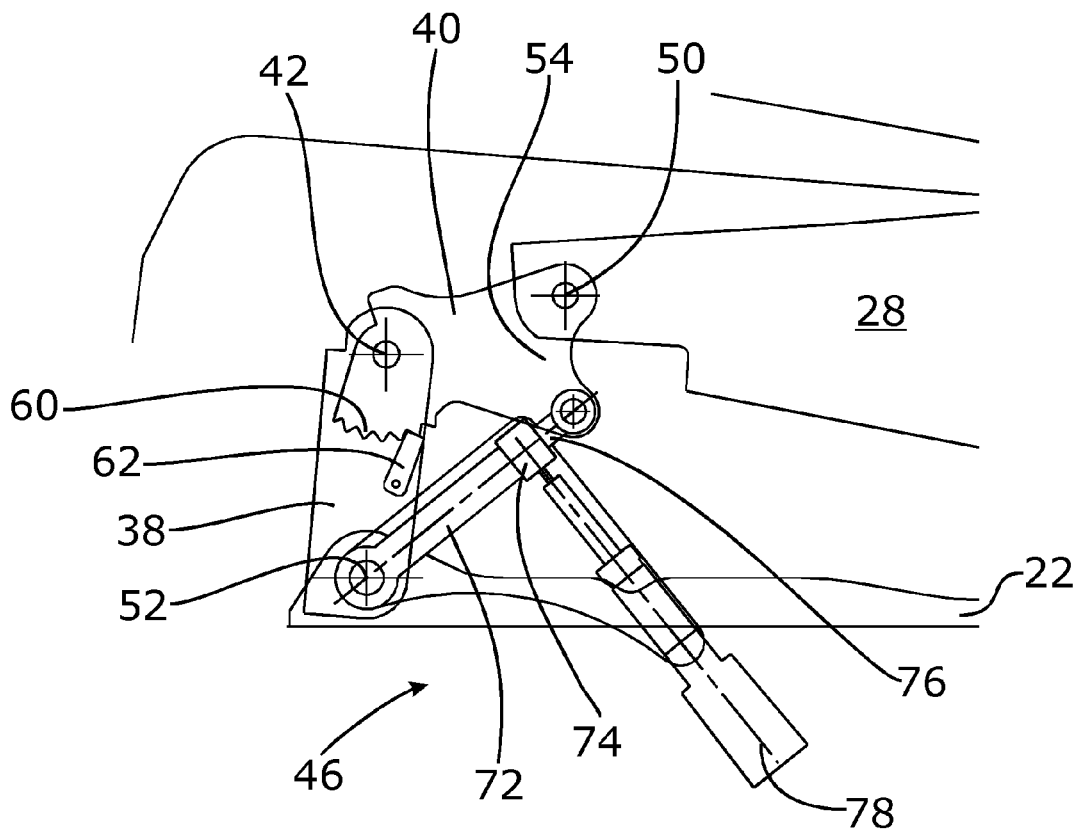
FIG. 6: shows a detail of FIG. 5 to an enlarged scale for the front part of the seat.
Figure 7:
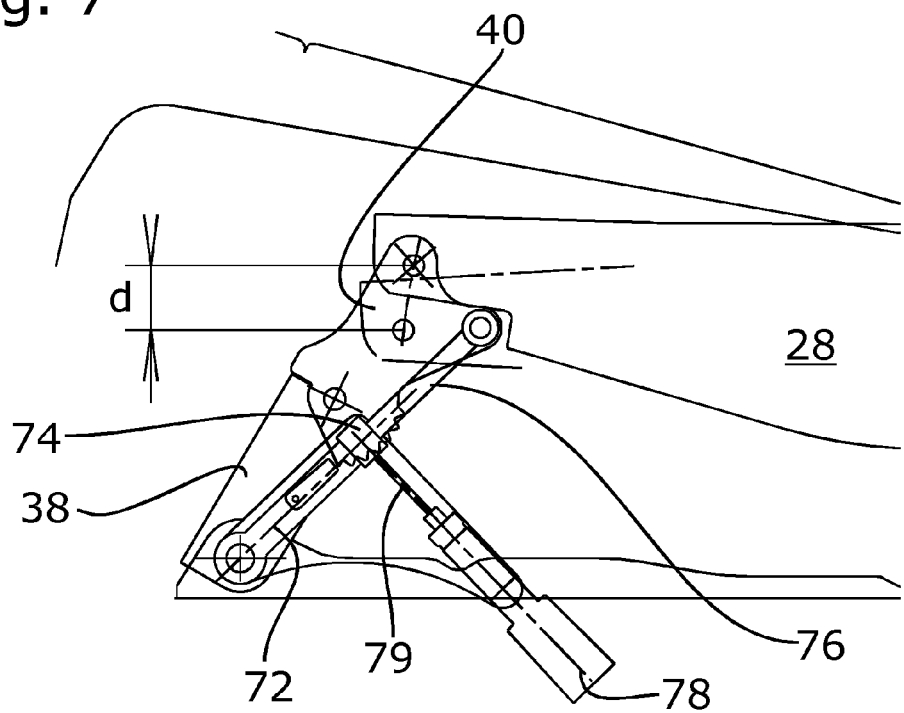
FIG. 7: shows the enlarged detail, but now in the crash position.

In a known way, the motor vehicle seat has an underframe 20 that comprises in the first exemplary embodiment shown in the FIGS. 1 through 4 and in the second exemplary embodiment shown in the FIGS. 5 through 7 a base 22, a left and a right rear rocker 24 and a front pair of rockers 26. The base 22 is usually formed from two pairs of rails (see FIG. 5) which allow for longitudinal adjustment in substantially the x direction; the reader is referred in this context to the prior art mentioned herein above. The base 22 is intended to be connected to an underbody of a motor vehicle (both not shown).

Further, the motor vehicle seat has a seat carrier 28 that is carried by the de-scribed underframe 20. In the concrete exemplary embodiment, this seat carrier 28 is respectively formed by a left and a right seat side part. Each side part is hinge-linked at the front to the front pair of rockers 26, in the rear part, it is carried by the respective rear rocker 24, an actually known fixing device 30 being provided in order to stop the four-bar linkage formed from the base 22, the rear rockers 24, the seat carrier 28 and the front pair of rockers 26. In the bottom part, the rear rockers 24 are pivotal about a rear pivot axis 32, which extends in the y direction.

Finally, the motor vehicle seat has a seat back 34. It is connected to the seat carrier 28 through a hinge mounting 36.

Instead of a left and a right individual front rocker, the front pair of rockers 26 comprises one bottom rocker 38 and one top rocker 40 on either side of the seat, both together forming a pair of levers. They are hinge-linked together in a central hinge point 42. In the condition respectively adopted in FIG. 1 and in FIG. 5, lines connecting their hinge points intersect at a first angle 44. This angle is of about 100°, in any case close to a right angle. As a result, the top rocker 40 is substantially an extension of the side part and the bottom rocker 38 is substantially transverse to the plane defined by the base 22.

There is provided a drive device 46 the function of which is to raise the front part of the seat carrier 28 and, as a result thereof, a front edge 48 of the seat. This means that the seat carrier 28 and the seat back 34 pivot about the rear pivot axis 32. Next, meaning in the position shown in FIG. 2, a top hinge point 50 of the front rocker arrangement is raised with respect to the plane formed by the base 22 by an amount d which is for example equal to 25 mm. This occurs substantially in the z direction. At the same time, an upper edge of the seat back 34 is displaced backward a distance R, substantially in the negative x direction. This distance R is for example equal to 80 mm.

The drive device 46 is attached on the one side to a bottom hinge point 52 of the front rocker arrangement and on the other side to a nose 54 of the top rocker 40, where it is articulated. In the normal condition, this nose is advantageously located in the negative z direction underneath the top hinge point 50, the distance is about 140% of d. The drive device 46 is configured to be a device that expands in its longitudinal direction. It is for example a cylinder and piston unit that is pressurized with compressed air, for example with an electrically ignitable propellant. It can also be a unit with spindle and spindle nut and with an associated electric motor, see for example DE 10 2007 030 445 A1. In the exemplary embodiment, its adjustment path is approximately twice d, which can also be seen from the geometry.

A crash sensor 56 is associated with the drive device 46. It is provided anywhere and is preferably located in proximity to the drive device 46. A prior art crash sensor 56 is used. An already existing crash sensor 56, for example for an airbag or for a seat belt tightener, can be used. The crash sensor 56 is connected to the drive device 46 through a line. It enables said drive device upon an acceleration due to an accident; this occurs according to prior art. At need, there is provided a control apparatus between the crash sensor 56 and the drive device 46.

The two rockers 48, 50 and the drive device 46 form one structural unit. It is possible to provide one drive device 46 on either seat side; but it is also possible to provide a drive device 46 on only one seat side. In the latter case, the two seat sides are joined together by at least one appropriate tie bar so that the two seat sides are being raised. The energy supplied by the drive device 46 in the event of a crash suffices to pivot a motor vehicle seat in the manner described about a smaller angle of for example 1 to 5°, inclusive of a passenger seated thereon. It is advantageous that the center of gravity of the passenger and also of the motor vehicle seat must not be raised the same amount as the front edge of the seat. Since the passenger is being displaced backward, the center of gravity remains substantially spaced the same distance from the base as before.

A stop device 58 is associated with the drive device 46. Its function is to keep the front edge of the seat raised or the seat carrier and the seat back pivoted. In the two exemplary embodiments, the stop device 58 is formed from an arcuate toothed region 60, which is for example formed on the top rocker 40 and is centered on the central hinge point 42, and from a spring-loaded catch 62 that en-gages said arcuate toothed region 60, the teeth of which are more specifically in the shape of saw teeth. Like on a rope drum with stop device, the catch 62 slides in one direction of rotation over the arcuate toothed region 60 when, from FIG. 3, it passes into the position shown in FIG. 4. The pair of levers consisting of the two rockers 38, 40 thereby achieves a stretched position. Preferably, the top rocker 40 is pivoted to such an extent that the second angle is greater than 180°, for example at least 5° greater than 180°. In FIG. 4, the second angle 45 is about 180°.

The bottom rocker 38 has a lower limit stop 64. The top rocker 40 has an upper limit stop 66. These limit stops 64, 66 are matched. In the crash condition as shown for example in FIG. 4, the limit stops 64, 66 abut each other and limit further pivotal opening movement of the two rockers 38, 40.

In the second exemplary embodiment shown in the FIGS. 5 through 7, one encounters the same geometrical conditions as in the first exemplary embodiment. Herein after, only the major differences will be substantially discussed: The base 22 is now only formed by one respective pair of rails on either side of the seat; a top rail 68 and a bottom rail 70 can be seen.

The drive device 46 now has an-other configuration. It has a bottom part 72 that comprises a rotatable nut 74 and a top part 76 that has a threaded spindle. The rotatable nut 74 forms a surrounding grip around this threaded spindle. Like in the first exemplary embodiment, the arrangement consisting of bottom part 72 and top part 76 is associated with the pair of levers consisting of the two rockers 38, 40 and is arranged like the complete drive device 46 of the first exemplary embodiment.

A rope 79 is wound about the rotatable nut; this rope 79 is fixed in a pulling de-vice 78. Upon actuation of this pulling device, the nut 74 is rotated quite quickly and the top part 76 is moved out into the position shown in FIG. 7. Reviewing the FIGS. 6 and 7 concurrently, it appears that the visible part of the rope 79 is now considerably longer in FIG. 7 than in FIG. 6. A propellant such as a cylinder and piston unit can be used as the pulling device 76. An electric motor can also be utilized, though. The pulling device 78 can be oriented in any direction, e.g., also in the y direction.

Figure 1:
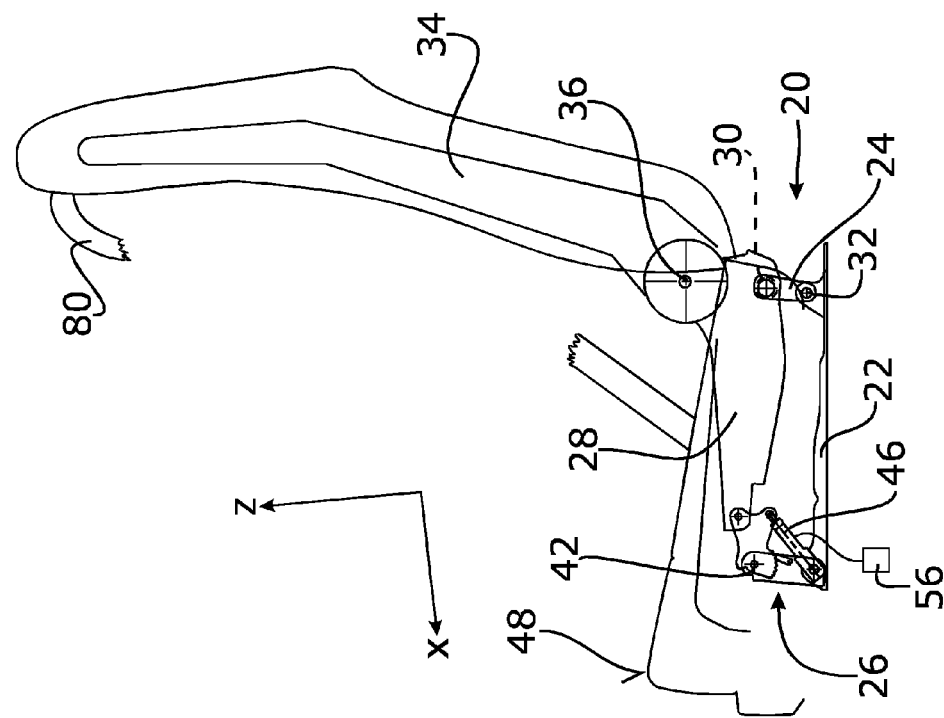
FIG. 1: is a simplified side view of a motor vehicle seat that is located in the normal position of utilization.
Figure 2:
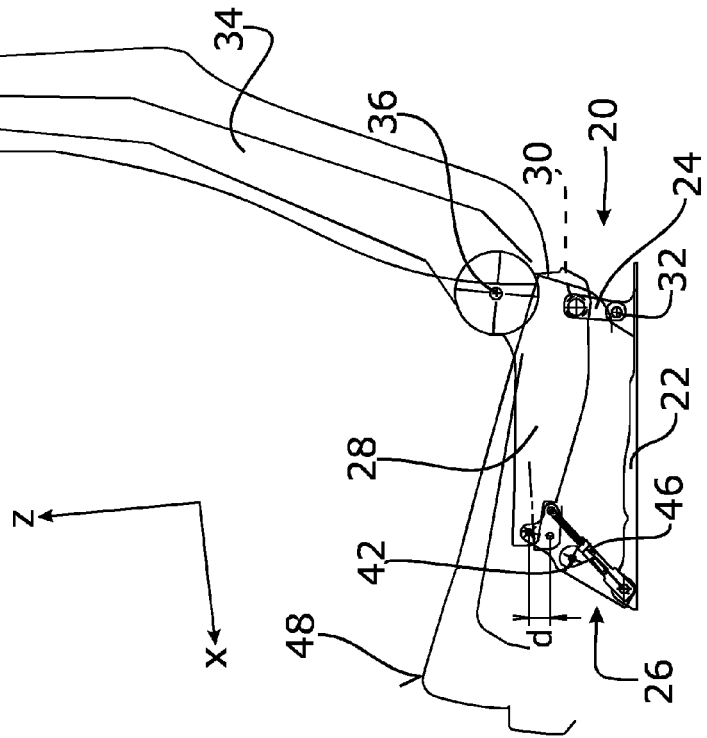
FIG. 2: shows the motor vehicle seat as shown in FIG. 1, but now after an accident; it is pivoted about a rear pivot point, the position of the seat back in the normal condition is shown in a dashed line.
Figure 3:
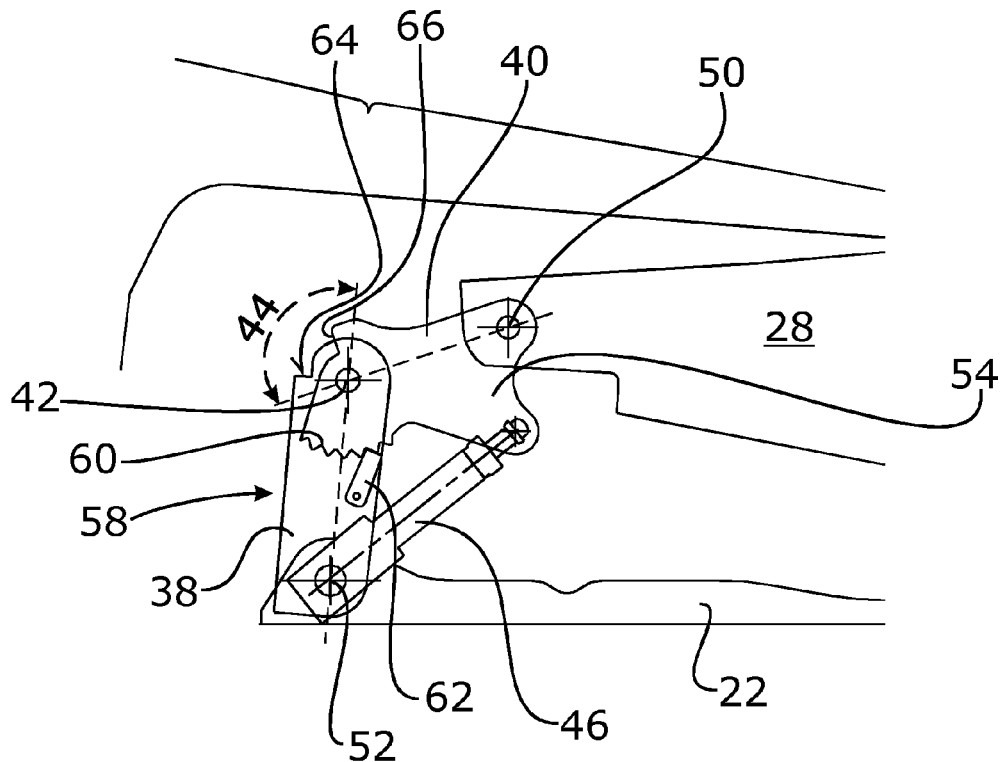
FIG. 3: is an enlarged illustration of a detail of the front seat part as shown in FIG. 1, but now without any crash sensor.

The motor vehicle seat is equipped with an actually known three-point safety belt 80, see FIG. 1.

What is claimed is:

1. A motor vehicle seat comprising:
   (a) an underframe having at least one base and at least one rear rocker connected to said base through a rear pivot axis; said underframe comprising a front rocker arrangement, said front rocker arrangement comprising a bottom rocker linked to said base at a front lower hinge point and a top rocker linked to a seat carrier, and said bottom rocker and said top rocker are hinge-linked together in a central hinge point;
   (b) said seat carrier carried by said underframe; and
   (c) a seat back connected to said seat carrier, wherein the motor vehicle seat further comprises a drive device attached to at least one of said bottom rocker and said top rocker and a crash sensor, said crash sensor controlling said drive device and enabling said drive device only in an event of a crash, and, in an event of a crash, said drive device pivots said seat carrier inclusive of said seat back about said rear pivot axis and a seat front edge of said seat carrier is raised at least 10 mm relative to said base, wherein said top rocker comprises a nose, said drive device is hinged to and arranged between said front lower hinge point and said nose.

2. The motor vehicle seat as set forth in claim 1, wherein said motor vehicle seat comprises an integrated safety belt.

3. The motor vehicle seat as set forth in claim 1, wherein the bottom rocker and the top rocker are inclined with respect to each other at a first angle in a normal no-crash condition, and in an event of a crash, said bottom rocker and said top rocker are inclined at a second angle with respect to each other, said second angle being at least 10° greater than the first angle.

4. The motor vehicle seat as set forth in claim 1, further comprising a stop device, wherein said stop device retains said seat carrier in a pivoted position.

5. The motor vehicle seat as set forth in claim 4, wherein said stop device is associated with said drive device and is located in proximity to said drive device.

6. The motor vehicle seat as set forth in claim 4, wherein said stop device comprises a spring-loaded catch and a toothed part cooperating with said spring-loaded catch.

7. The motor vehicle seat as set forth in claim 1, wherein said bottom rocker comprises a lower limit stop and said top rocker comprises an upper limit stop, said lower limit stop and said upper stop contacting each other in an event of a crash.

8. The motor vehicle seat as set forth in claim 1, wherein said base comprises at least one pair of rails, and said rear pivot axis is arranged above said at least one pair of rails.

9. The motor vehicle seat as set forth in claim 1, wherein said drive device is attached to said base.

10. The motor vehicle seat as set forth in claim 1, wherein said seat front edge of said seat carrier is raised at least 20 mm relative to said base.

11. The motor vehicle seat as set forth in claim 1, wherein said drive device is attached to both said bottom rocker and said top rocker.

12. The motor vehicle seat as set forth in claim 1, wherein said drive device is hinged to said base.

13. A motor vehicle seat comprising:
   (a) an underframe having at least one base, said underframe comprising a front rocker arrangement, said front rocker arrangement comprising a bottom rocker linked to said base at a front lower hinge point and a top rocker linked to a seat carrier and at least one rear rocker connected to said base through a rear pivot axis, said base comprises at least one pair of rails;
   (b) a seat carrier carried by said underframe; and
   (c) a seat back connected to said seat carrier, wherein the motor vehicle seat further comprises a drive device and a crash sensor, said crash sensor controlling said drive device and enabling said drive device only in an event of a crash, and, in an event of a crash, said drive device pivots said seat carrier inclusive of said seat back about said rear pivot axis and a seat front edge of said seat carrier is raised at least 10 mm relative to said base; and wherein said drive device is hinged to and arranged between said base and said top rocker and above said pair of rails.

* * * * *